(12) United States Patent
Sawada et al.

(10) Patent No.: US 7,942,985 B2
(45) Date of Patent: *May 17, 2011

(54) ALLOY FOR SOFT MAGNETIC LAYER IN PERPENDICULAR MAGNETIC RECORDING MEDIUM

(75) Inventors: Toshiyuki Sawada, Himeji (JP); Akihiko Yanagitani, Himeji (JP)

(73) Assignee: Sanyo Special Steel Co., Ltd., Hyogo-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/601,655

(22) PCT Filed: May 1, 2008

(86) PCT No.: PCT/JP2008/058370
§ 371 (c)(1),
(2), (4) Date: Nov. 24, 2009

(87) PCT Pub. No.: WO2008/146574
PCT Pub. Date: Dec. 4, 2008

(65) Prior Publication Data
US 2010/0209284 A1    Aug. 19, 2010

(30) Foreign Application Priority Data

May 29, 2007   (JP) .................................. 2007-142107

(51) Int. Cl.
*H01F 1/147*   (2006.01)
(52) U.S. Cl. ........................ 148/311; 148/313; 148/315
(58) Field of Classification Search .................... None
See application file for complete search history.

(56) References Cited

U.S. PATENT DOCUMENTS

| 7,524,570 | B2 * | 4/2009 | Dai et al. | 428/827 |
| 2007/0087225 | A1 * | 4/2007 | Dai et al. | 428/827 |
| 2007/0251821 | A1 * | 11/2007 | Yanagitani et al. | 204/298.13 |
| 2008/0038145 | A1 * | 2/2008 | Yanagitani et al. | 420/125 |
| 2008/0083616 | A1 * | 4/2008 | Fukuoka et al. | 204/298.13 |
| 2008/0112841 | A1 * | 5/2008 | Hayashi et al. | 420/79 |
| 2008/0138235 | A1 * | 6/2008 | Sawada et al. | 420/125 |
| 2009/0071822 | A1 * | 3/2009 | Sawada et al. | 204/298.13 |

FOREIGN PATENT DOCUMENTS

| JP | 2002-275594 | * | 9/2002 |
| JP | 2004-030740 | A | 1/2004 |
| JP | 2004-288348 | A | 10/2004 |
| JP | 2005-320627 | A | 11/2005 |
| JP | 2007-073136 | A | 3/2007 |
| JP | 2007-284741 | A | 11/2007 |
| JP | 2007-294032 | A | 11/2007 |
| JP | 2007-297688 | * | 11/2007 |
| JP | 2008-127588 | A | 6/2008 |

OTHER PUBLICATIONS

Machine Translation of JP 2007-297688.*

* cited by examiner

*Primary Examiner* — John P Sheehan
(74) *Attorney, Agent, or Firm* — The Webb Law Firm

(57) ABSTRACT

A soft magnetic alloy for perpendicular magnetic recording medium excellent in saturation magnetic flux density, amorphousness and atmospheric corrosion resistance. The alloy is an Fe—Co based alloy and comprises Fe in an amount satisfying 0.25 to 0.65 of Fe/(Fe+Co) ratio, which is an atomic ratio of Fe and Fe+Co; Zr+Hf in an amount of 6 to 100 at %; Na+Ta in an amount of 0 to 2 at %; Al and/or Cr in an amount of 0 to 5 at %; and the balance Co and unavoidable impurities. A part of Zr and/or Hf can be replaced by B, provided that the amount of B to replace Zr and/or Hf is double in at % of the total amount of Zr and Hf to be replaced and that the total amount of Zr and Hf after replacement is 4 at % or more.

2 Claims, No Drawings

ALLOY FOR SOFT MAGNETIC LAYER IN PERPENDICULAR MAGNETIC RECORDING MEDIUM

BACKGROUND OF THE INVENTION

1. Field of the Invention

The present invention relates to an alloy for a soft magnetic layer in a perpendicular magnetic recording medium excellent in saturation magnetic flux density, amorphousness, and atmospheric corrosion resistance.

2. Description of the Related Art

In recent years, accompanied with remarkable progress of magnetic recording technology, recording density of the magnetic recording medium is becoming higher to increase the capacity of the drive. However, for the magnetic recording medium with a longitudinal magnetic recording system that is widely used currently, since the recording bit must be miniaturized in order to realize the high recording density, high coercivity is required such that the recording with the recording bit is not possible. Therefore, a perpendicular magnetic recording system is being investigated as a means to solve these problems and increase the recording density.

In the perpendicular magnetic recording system, the axis of easy magnetization is formed to be oriented perpendicular to the medium surface in the magnetic film of the perpendicular magnetic recording medium and this system is suitable for high recording density. In this perpendicular magnetic recording system, a double-layer recording medium having a magnetic recording layer with high recording sensitivity and a soft magnetic layer has been developed. For this magnetic recording layer, a CoCrPt—$SiO_2$-based alloy is commonly used.

On the other hand, as the soft magnetic layer, a CoZrNb/Ta alloy disclosed in, e.g., Japanese Patent Laid-Open Publication No. 2005-320627, an (Fe, Co, Ni) (Al, Cr) (B, Nb, Zr, Ta, Hf, Ti, V) alloy disclosed in, e.g., Japanese Patent Laid-Open Publication No. 2007-284741, and the like have been proposed.

However, the CoZrNb/Ta alloy described in Japanese Patent Laid-Open Publication No. 2005-320627 provides only a lower level of saturation magnetic flux density compared to that required for the soft magnetic layer of the perpendicular magnetic recording medium. In contrast, an alloy with a high saturation magnetic flux density has been developed as disclosed in Japanese Patent Laid-Open Publication No. 2007-284741. The saturation magnetic flux density of this alloy has been increased by the addition of Fe, while preventing deterioration of atmospheric corrosion resistance as its adverse effect by the addition of Al/Cr. This alloy has excellent saturation magnetic flux density and atmospheric corrosion resistance as the soft magnetic film in the perpendicular magnetic recording medium. However, performances required for the soft magnetic film in the perpendicular magnetic recording medium is recently becoming so high that even the alloy described in Japanese Patent Laid-Open Publication No. 2007-284741 cannot fully satisfy the required performances. As used herein, atmospheric corrosion resistance means corrosion resistance in indoor environments where an apparatus equipped with an electronic component(s) is used. In addition, amorphousness means easiness of amorphous formation when the alloy is quenched and solidified or sputtered for film forming.

SUMMARY OF THE INVENTION

The inventors have currently found an optimum element and its additive amount in the addition of amorphous formation-enhancing elements such as B, Nb, Zr, Ta, Hf, Ti, V and the like. Furthermore, the inventors have revealed that Co and Fe, which are not amorphous formation-enhancing elements, also affect the amorphousness and found their optimum range. As a result, a range has been revealed, wherein the saturation magnetic flux density, amorphousness and atmospheric corrosion resistance are well balanced and the soft magnetic layer of the perpendicular magnetic recording medium shows excellently balanced properties. Furthermore, it has been revealed that the atmospheric corrosion resistance could be improved by adding an appropriate amount of Al/Cr as needed, without deteriorating the saturation magnetic flux density and amorphousness.

Thus, the present invention is to provide a soft magnetic alloy for a perpendicular magnetic recording medium excellent in saturation magnetic flux density, amorphousness and atmospheric corrosion resistance.

According to an aspect of the present invention, there is provided an alloy for a soft magnetic layer in a perpendicular magnetic recording medium, the alloy being an Fe—Co based alloy and comprising:

Fe: an amount satisfying 0.25 to 0.65 of Fe/(Fe+Co) ratio, which is an atomic ratio of Fe and Fe+Co;

Zr+Hf: 6 to 11 at %;

Nb+Ta: 0 to 2 at %;

Al and/or Cr: 0 to 5 at %; and the balance Co and unavoidable impurities.

DETAILED DESCRIPTION OF THE PREFERRED EMBODIMENTS

The alloy for the soft magnetic layer of the perpendicular magnetic recording medium according to the present invention comprises an Fe—Co based alloy. The Fe—Co based alloy comprises Fe in an amount satisfying 0.25 to 0.65 of Fe/(Fe+Co) ratio, which is an atomic ratio of Fe and Fe+Co; Zr+Hf in an amount of 6 to 11 at %; Nb+Ta in an amount of 0 to 2 at %; Al and/or Cr in an amount of 0 to 5 at %; and the balance Co and unavoidable impurities.

Hereinafter, reasons for limiting the component composition according to the present invention will be described. The alloy according to the present invention contains Fe in an amount such that the Fe/(Fe+Co) ratio is 0.25 to 0.65 (atomic ratio), preferably 0.30 to 0.50. The Fe/(Fe+Co) ratio is a parameter which heavily affects the saturation magnetic flux density, amorphousness and atmospheric corrosion resistance. If the Fe/(Fe+Co) ratio exceeds 0.65, the atmospheric corrosion resistance decreases. If the Fe/(Fe+Co) ratio is small, not only the saturation magnetic flux density decreases but the amorphousness also deteriorates. If the ratio is 0.20 or more and less than 0.25, the amorphousness is low. If the ratio is less than 0.20, the saturation magnetic flux density is low. Although Japanese Patent Laid-Open Publication No. 2007-284741 describes that the saturation magnetic flux density becomes low if the Fe/(Fe+Co) ratio is less than 0.20, it is one of the characteristics of the present invention to have further found that the amorphousness also decreases in the range of 0.20 or more and less than 0.25. In addition, although the amount of Fe in the total alloy is not particularly limited as long as the above-mentioned ratio is satisfied, it is preferably 23 to 50 at %, more preferably 25 to 40 at %.

The alloy according to the present invention contains Zr+Hf in an amount of 6 to 11 at %, preferably 7 to 9 at %. Zr and Hf belong to the same group in the periodic table, and have similar phase diagrams with Co or Fe while exhibiting similar behaviors in the alloy of the present invention. It is therefore possible to consider the amounts of Zr and Hf in total of Zr+Hf. Amorphous materials can be obtained by the addition of an appropriate amount of any of the amorphous formation-enhancing elements described in Japanese Patent Laid-Open Publication No. 2005-320627 and Japanese Patent Laid-Open Publication No. 2007-284741. However, since these elements are all non-magnetic elements, the saturation magnetic flux density decreases with the increase of the amount to be added. Therefore, it becomes very important to be able to efficiently enhance the amorphous formation with a less amount to be added.

Accordingly, as a result of detailed investigation about these amorphous formation-enhancing elements, it has been evidently found that Zr and Hf have far higher enhancing effect for the amorphous formation compared with other amorphous formation-enhancing elements (B, Ti, V, Nb, and Ta) described in Japanese Patent Laid-Open Publication No. 2005-320627 and Japanese Patent Laid-Open Publication No. 2007-284741. That is, since the amount to be added for the amorphous formation can be lowered, it is consequently possible to prevent the decrease of saturation magnetic flux density. Thus, it is the most important feature of the present invention to have found that the effective amorphous formation is realized by the addition of Zr and Hf with no or a trace amount of less efficient Ti, V, Nb, and Ta.

As will be described later, although the effect of B for the amorphous formation is inferior to that of Zr and Hf, it is effective when added simultaneously with Zr and Hf, since decrease in the saturation magnetic flux density is small when a certain amount of B is added. Note that, if the amount of Zr+Hf is less than 6 at %, the effect of amorphous formation is not sufficient. The addition of Zr+Hf more than 11 at % no longer increases the effect of amorphous formation and acts only for lowering the saturation magnetic flux density.

The alloy according to the present invention contains Nb+Ta in an amount of 2 at % or less. Nb and Ta belong to the same group in the periodic table, and have similar phase diagrams with Co or Fe while exhibiting similar behaviors in the alloy of the present invention. It is therefore possible to consider the amounts of Nb and Ta in total of Nb+Ta. Although Nb and Ta are amorphous formation-enhancing elements as mentioned above, their amorphous formation effect is small compared with that of Zr and Hf. Therefore, a large amount of Nb and Ta should be added in order to attain the same amorphousness as attained with the addition of Zr and Hf, resulting in a large decrease in the saturation magnetic flux density. Therefore, it is required to limit the amount of Nb+Ta to 2 at % or less. Preferably, Nb and Ta are not added.

The alloy according to the present invention contains Al and/or Cr in an amount of 0 to 5 at %, preferably 0.5 to 3 at % in total. Although Al and Cr are the elements that improve atmospheric corrosion resistance, they lower the saturation magnetic flux density at the same time. Note that, the addition of Al and Cr more than 5 at % excessively lowers the saturation magnetic flux density. Although B is an amorphous formation-enhancing element and can replace Zr and Hf in a double amount, a large amount of B should be added to attain sufficient amorphousness compared with Zr and Hf. However, decrease in the saturation magnetic flux density is smaller than Zr and Hf, if the similar amount is added. Therefore, it is very effective if B is added simultaneously with Zr and Hf.

According to a preferred embodiment of the present invention, in the above-mentioned alloy for the soft magnetic layer, a part of Zr and/or Hf can be replaced by B, such that the amount of B to replace Zr and/or Hf is double in at % of the total amount of Zr and Hf to be replaced and that the total amount of Zr and Hf after replacement is 4 at % or more. That is, the present inventors have found that the hardness of the alloy of the present invention also increases by the addition of B. This is also one of the features of the present invention. This feature can meet the requirement to increase the hardness of the soft magnetic layer in order to prevent flaws on the disc for the perpendicular magnetic recording medium which has recently become a problem. Since it has been confirmed that increasing the amount of Zr, Hf, Nb and Ta provides little effect on the increase of hardness, the addition of B is considered to play a vital role in increasing the hardness. Note that the total amount of Zr+Hf should be replaced by B in a double amount (for example, Zr+Hf is replaced by 2B, as 90(50Co50Fe)6Zr4B and 88(50Co50Fe)4Zr8B for 92(50Co50Fe)8Zr). It was found that 2 at % of B is almost equivalent to 1 at % of Zr or Hf in terms of decrease in saturation magnetic flux density. However, if the total amount of Zr+Hf after the replacement by B is less than 4 at %, the saturation magnetic flux density and the corrosion resistance deteriorate.

EXAMPLES

Hereinafter, the present invention will be more specifically described with reference to examples.

A soft magnetic layer of a perpendicular magnetic recording medium is usually obtained by sputtering a sputtering target material with the same composition as the layer and forming a film on a glass substrate or the like. In this process the thin film formed by sputtering has been quenched. In contrast, in the present invention, a quenched ribbon prepared through a single-roll liquid quenching apparatus is used as a specimen for Examples and Comparative Examples. This is to evaluate the influence of the components of the thin film actually formed by sputtering and quenching on various properties, in a simple manner using a liquid quenched ribbon.

Preparation of the Specimens

Thirty grams each of the raw materials weighed for the component composition shown in Table 1 and Table 2 were prepared. The materials were arc melted in a water-cooled copper hearth with a diameter of about 10×40 mm in reduced pressure Ar to prepare the raw material for the quenched ribbon. Specifically, a single roll method was adopted and the raw material was set in a silica tube with a diameter of 15 mm to perform tapping under the following conditions.

Tapping nozzle diameter: 1 mm

Environment pressure: 61 kPa

Atomization differential pressure: 69 kPa

Rotation speed of the copper roll (diameter 300 mm): 3000 rpm

Gap between the copper roll and the tapping nozzle: 0.3 mm

The temperature at which each raw material melted down was taken as the tapping temperature. Using the quenched ribbons thus prepared as the specimens, the following evaluations were conducted.

Evaluation of the Saturation Magnetic Flux Density

The saturation magnetic flux density was measured using a VSM apparatus (vibrating sample magnetometer) with an applied magnetic field of 15 kOe. The weight of the specimens was about 15 mg.

Evaluation of the Amorphousness

Usually, when an X-ray diffraction pattern of an amorphous material is measured, a diffraction peak is not observed and a halo pattern specific to the amorphous material is observed. In addition, if the material is not completely amorphous, although a diffraction peak is observed, the peak height is lower and the half width (width at the half height of the diffraction peak) is broader compared with a crystalline material. The half width correlates with the amorphousness of the material and there is a feature that, higher the amorphousness, broader the diffraction peak and larger the half width.

Accordingly, the amorphousness was evaluated in the following manner. A specimen was adhered on a glass plate with a double-faced adhesive tape, and a diffraction pattern was obtained with an X-ray diffraction apparatus. In this case, the specimen was adhered on the glass plate so that the surface of the quenched ribbon in contact with the copper roll was the surface to be measured. The X-ray source was Cu-kα ray and the measurement was performed at a scan speed of 4°/min. The amorphousness was evaluated by measuring the half width of the main peak through an image analysis of the diffraction pattern.

Evaluation of the Atmospheric Corrosion Resistance

A specimen was adhered on a glass plate with a double-faced adhesive tape, and the salt spray test was performed using 5% NaCl at 35° C. for 16 hours. The evaluation criteria were based on the appearance after the test as follows.

Good: Slightly rusted

Fair: Rusted in some parts

Poor: Rusted on the whole surface

Evaluation of the Hardness

A specimen was longitudinally embedded in a resin and polished. The Vickers hardness (HV) was then measured with a micro Vickers hardness tester. The measuring load was 50 g and the evaluation was based on the average of n=10. Indentation size was about 10 μm.

Criteria of the Total Balance

The specimen which exhibited a saturation magnetic flux density less than 1.40, a half width less than 0.6, and/or rust on the whole surface was ranked as poor in the total balance.

The specimens were ranked as "excellent", "good" or "fair" in order of superiority in the total balance of three characteristics, i.e., saturation magnetic flux density, half width and atmospheric corrosion resistance.

TABLE 1

| No. | Fe | Zr | Hf | Al | Cr | Co | Other added element | Fe/(Fe + Co) | Saturation magnetic flux density (T) | Half Width (°) | Atmospheric corrosion resistance | Total balance | Notes |
|---|---|---|---|---|---|---|---|---|---|---|---|---|---|
| 1 | 28.2 | 6 | 0 | 0 | 0 | balance | | 0.30 | 1.68 | 0.6 | Fair | Good | Inventive Example |
| 2 | 27.9 | 7 | 0 | 0 | 0 | balance | | 0.30 | 1.62 | 0.7 | Fair | Good | Inventive Example |
| 3 | 27.6 | 8 | 0 | 0 | 0 | balance | | 0.30 | 1.56 | 0.8 | Fair | Good | Inventive Example |
| 4 | 27.3 | 9 | 0 | 0 | 0 | balance | | 0.30 | 1.49 | 1.8 | Good | Excellent | Inventive Example |
| 5 | 27 | 10 | 0 | 0 | 0 | balance | | 0.30 | 1.44 | 2.8 | Good | Good | Inventive Example |
| 6 | 26.7 | 11 | 0 | 0 | 0 | balance | | 0.30 | 1.40 | 4.8 | Good | Good | Inventive Example |
| 7 | 28.2 | <u>3</u> | <u>3</u> | 0 | 0 | balance | | 0.30 | 1.67 | 0.6 | Fair | Good | Reference Example |
| 8 | 27 | <u>5</u> | <u>5</u> | 0 | 0 | balance | | 0.30 | 1.42 | 2.6 | Good | Good | Reference Example |
| 9 | 28.2 | <u>0</u> | <u>6</u> | 0 | 0 | balance | | 0.30 | 1.67 | 0.6 | Fair | Good | Reference Example |
| 10 | 27 | <u>0</u> | <u>10</u> | 0 | 0 | balance | | 0.30 | 1.42 | 2.7 | Good | Good | Reference Example |
| 11 | 45 | 8 | 0 | 1 | 1 | balance | | 0.50 | 1.56 | 3.1 | Fair | Good | Inventive Example |
| 12 | 44 | 8 | 0 | 4 | 0 | balance | | 0.50 | 1.46 | 5.9 | Fair | Good | Inventive Example |
| 13 | 45 | 8 | 0 | 0 | 2 | balance | | 0.50 | 1.54 | 0.6 | Good | Good | Inventive Example |
| 14 | 44 | 8 | 0 | 0 | 4 | balance | | 0.50 | 1.42 | 0.7 | Good | Good | Inventive Example |
| 15 | 37.2 | 7 | 0 | 0 | 0 | balance | | 0.40 | 1.74 | 0.6 | Fair | Good | Inventive Example |
| 16 | 46 | 8 | 0 | 0 | 0 | balance | | 0.50 | 1.64 | 2.3 | Fair | Excellent | Inventive Example |
| 17 | 59.8 | 8 | 0 | 0 | 0 | balance | | 0.65 | 1.68 | 2.0 | Fair | Good | Inventive Example |
| 18 | 27.3 | 7 | 0 | 0 | 0 | balance | Nb: 2 | 0.30 | 1.49 | 0.8 | Fair | Good | Inventive Example |
| 19 | 27.3 | 7 | 0 | 0 | 0 | balance | Ta: 2 | 0.30 | 1.48 | 0.8 | Fair | Good | Inventive Example |
| 20 | 23 | 8 | 0 | 0 | 0 | balance | | 0.25 | 1.51 | 0.8 | Good | Good | Inventive Example |
| 21 | 45 | <u>0</u> | <u>6</u> | 0 | 0 | balance | B: 2, Nb: 1, Ta: 1 | 0.50 | 1.50 | 2.0 | Fair | Good | Reference Example |
| 22 | 44 | 8 | 0 | 0 | 0 | balance | B: 4 | 0.50 | 1.51 | 6.5 | Good | Excellent | Inventive Example |
| 23 | 43 | <u>4</u> | <u>4</u> | 0 | 0 | balance | B: 6 | 0.50 | 1.43 | 7.1 | Good | Good | Inventive Example |
| 24 | 0 | 8 | 0 | 0 | 0 | balance | | <u>0</u> | 1.24 | 1.9 | Good | Poor | Reference Example |
| 25 | 9.2 | 8 | 0 | 0 | 0 | balance | | <u>0.10</u> | 1.36 | 0.6 | Good | Poor | Reference Example |
| 26 | 18.4 | 8 | 0 | 0 | 0 | balance | | <u>0.20</u> | 1.43 | 0.6 | Fair | Fair | Reference Example |
| 27 | 65.1 | 7 | 0 | 0 | 0 | balance | | <u>0.70</u> | 1.59 | 1.8 | Poor | Poor | Reference Example |
| 28 | 28.5 | <u>5</u> | 0 | 0 | 0 | balance | | 0.30 | 1.74 | 0.4 | Poor | Poor | Reference Example |
| 29 | 26.7 | <u>12</u> | 0 | 0 | 0 | balance | | 0.30 | 1.35 | 2.1 | Good | Poor | Reference Example |
| 30 | 26.7 | <u>6</u> | <u>6</u> | 0 | 0 | balance | | 0.30 | 1.36 | 2.2 | Good | Poor | Reference Example |
| 31 | 43 | 8 | 0 | <u>6</u> | 0 | balance | | 0.50 | 1.37 | 5.7 | Good | Poor | Reference Example |
| 32 | 43 | 8 | 0 | 0 | <u>6</u> | balance | | 0.50 | 1.36 | 0.7 | Good | Poor | Reference Example |
| 33 | 27.3 | 7 | 0 | 0 | 0 | balance | <u>Ti: 2</u> | 0.30 | 1.48 | 0.7 | Fair | Fair | Reference Example |
| 34 | 27.3 | 7 | 0 | 0 | 0 | balance | <u>V: 2</u> | 0.30 | 1.49 | 0.6 | Poor | Poor | Reference Example |
| 35 | 27.3 | 7 | 0 | 0 | 0 | balance | <u>Nb: 3</u> | 0.30 | 1.42 | 2.4 | Fair | Fair | Reference Example |
| 36 | 27.3 | 7 | 0 | 0 | 0 | balance | <u>Ta: 3</u> | 0.30 | 1.42 | 2.3 | Fair | Fair | Reference Example |
| 37 | 42 | 8 | 0 | 0 | 0 | balance | <u>B: 8</u> | 0.50 | 1.36 | 7.0 | Good | Poor | Reference Example |
| 38 | 27.6 | <u>3</u> | <u>0</u> | 0 | 0 | balance | B: 10 | 0.30 | 1.39 | 1.3 | Fair | Poor | Reference Example |

Note:
Underlined figures are out of the conditions of the present invention

TABLE 2

| No. | Component composition of quenched ribbon (at %) | | | | | | | Fe/(Fe + Co) | Saturation magnetic flux density (T) | Half Width (°) | Atmospheric corrosion resistance | Hardness (HV50 g) | Total balance | Notes |
|---|---|---|---|---|---|---|---|---|---|---|---|---|---|---|
| | Fe | Zr | Hf | Al | Cr | Co | Other added element | | | | | | | |
| 1 | 46 | 8 | 0 | 0 | 0 | balance | | 0.50 | 1.64 | 2.3 | Fair | 720 | Excellent | Inventive Example |
| 2 | 45 | 8 | 0 | 0 | 0 | balance | B: 2 | 0.50 | 1.57 | 6.2 | Fair | 840 | Excellent | Inventive Example |
| 3 | 44 | 8 | 0 | 0 | 0 | balance | B: 4 | 0.50 | 1.51 | 6.5 | Good | 880 | Excellent | Inventive Example |
| 4 | 43 | 8 | 0 | 0 | 0 | balance | B: 6 | 0.50 | 1.43 | 7.1 | Good | 900 | Good | Inventive Example |
| 5 | 40 | 4 | 0 | 0 | 0 | balance | B: 8 | 0.50 | 16.80 | 4.5 | Fair | 1030 | Good | Inventive Example |
| 6 | 27.9 | 7 | 0 | 0 | 0 | balance | | 0.30 | 1.62 | 0.7 | Fair | 780 | Good | Inventive Example |
| 7 | 27 | 10 | 0 | 0 | 0 | balance | | 0.30 | 1.42 | 2.8 | Good | 760 | Good | Inventive Example |
| 8 | 27 | <u>5</u> | <u>5</u> | 0 | 0 | balance | | 0.30 | 1.42 | 2.6 | Good | 780 | Good | Reference Example |
| 9 | 27.3 | 7 | 0 | 0 | 0 | balance | <u>Nb: 3</u> | 0.30 | 1.42 | 2.4 | Fair | 730 | Fair | Reference Example |
| 10 | 27.3 | 7 | 0 | 0 | 0 | balance | <u>Ta: 3</u> | 0.30 | 1.42 | 2.3 | Fair | 750 | Fair | Reference Example |

Note:
Underlined figures are out of the conditions of the present invention

In comparative examples No. 24 to 26 shown in Table 1, the saturation magnetic flux density is decreased while the amorphousness is deteriorated due to low Fe/(Fe+Co) values. In comparative example No. 27, the atmospheric corrosion resistance is poor due to a high Fe/(Fe+Co) value. In comparative example No. 28, the amorphousness and the atmospheric corrosion resistance are poor due to a low Zr content. In comparative example No. 29, the saturation magnetic flux density is decreased while the total balance is poor due to a high Zr content.

In comparative example No. 30, the saturation magnetic flux density is decreased while the total balance is poor due to a high sum of Zr and Hf. In comparative example No. 31, the saturation magnetic flux density is decreased while the total balance is poor due to a high Al content. In comparative example No. 32, the saturation magnetic flux density is decreased while the total balance is poor due to a high Cr content. In comparative example No. 33 and 34, the atmospheric corrosion resistance while the total balance are poor since Ti and V are contained.

In comparative example No. 35, the atmospheric corrosion resistance is insufficient due to a high Nb content. In comparative example No. 36, the atmospheric corrosion resistance is insufficient due to a high Ta content. In comparative example No. 37, the saturation magnetic flux density is decreased while the total balance is poor, since the B content does not satisfy the condition that B should replace Zr in a double amount. In comparative example No. 38, the saturation magnetic flux density is decreased while the atmospheric corrosion resistance is poor since the sum of Zr+Hf is less than 4 at %. In contrast, it is realized that present invention examples No. 1 to 23 have excellent properties since they all satisfy the conditions of the present invention.

In Table 2, No. 1 to 7 are present invention examples while No. 08 to 10 are comparative examples. In comparative examples No. 9 and 10, the atmospheric corrosion resistance and the hardness are insufficient while the total balance is poor due to a high content of Nb and Ta. In contrast, it is realized that present invention examples No. 1 to 8 have excellent properties since they all satisfy the conditions of the present invention.

As mentioned above, according to the present invention, a soft magnetic alloy for the perpendicular magnetic recording medium excellent in saturation magnetic flux density, amorphousness and atmospheric corrosion resistance, as well as their balance, is provided by determining the range in which the excellent balance of the properties is exhibited in the soft magnetic layer of the perpendicular magnetic recording medium and by adding an appropriate amount of Al/Cr as needed to enable an improvement in the atmospheric corrosion resistance without deteriorating the saturation magnetic flux density and amorphousness.

The invention claimed is:

1. An alloy for a soft magnetic layer in a perpendicular magnetic recording medium, the alloy being an Fe—Co based alloy and consisting essentially of:
    Fe: an amount satisfying 0.25 to 0.65 of Fe/(Fe+Co) ratio, which is an atomic ratio of Fe and Fe+Co;
    Zr: 6 to 11 at %;
    Nb+Ta: 0 to 2 at %;
    Al and/or Cr: 0 to 5 at %; and
    balance Co and unavoidable impurities.

2. The alloy according to claim 1, wherein a part of Zr is replaced by B, provided that the amount of B to replace Zr is double in at % of the amount of Zr to be replaced and that the amount of Zr after replacement is 4 at % or more.

* * * * *